US012343662B2

(12) United States Patent
Shaw et al.

(10) Patent No.: US 12,343,662 B2
(45) Date of Patent: Jul. 1, 2025

(54) FILTER UNIT WITH FLOW OPTIMIZATION

(71) Applicant: Eaton Intelligent Power Limited, Dublin (IE)

(72) Inventors: Brandon Lee Shaw, Kalamazoo, MI (US); Jason Robert Swinehart, Portage, MI (US); Christopher Scott Rau, Battle Creek, MI (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 17/739,527

(22) Filed: May 9, 2022

(65) Prior Publication Data
US 2022/0362690 A1    Nov. 17, 2022

Related U.S. Application Data

(60) Provisional application No. 63/188,182, filed on May 13, 2021.

(51) Int. Cl.
*B01D 29/52* (2006.01)
*B01D 29/15* (2006.01)
*B01D 35/30* (2006.01)

(52) U.S. Cl.
CPC ............ *B01D 29/52* (2013.01); *B01D 29/15* (2013.01); *B01D 35/30* (2013.01); *B01D 2201/0446* (2013.01); *B01D 2201/287* (2013.01); *B01D 2201/30* (2013.01); *B01D 2201/32* (2013.01); *B01D 2201/44* (2013.01)

(58) Field of Classification Search
CPC ........ B01D 29/52; B01D 29/15; B01D 35/30; B01D 2201/0446; B01D 2201/287; B01D 2201/30; B01D 2201/32; B01D 2201/44; B01D 29/33; B01D 46/2407; B01D 46/2411; B01D 46/4281; B01D 46/58; B01D 46/02
USPC .... 210/323.2, 330, 455, 458, 459, 460, 487, 210/493.2, 450, 497.01, 446, 439
See application file for complete search history.

(56) References Cited

U.S. PATENT DOCUMENTS

| | | | |
|---|---|---|---|
| 5,209,844 A * | 5/1993 | Zievers | B01D 29/114 210/411 |
| 5,401,406 A | 3/1995 | Johnson et al. | |
| 5,785,870 A | 7/1998 | Davis et al. | |
| 5,964,909 A | 10/1999 | Brunner | |

(Continued)

FOREIGN PATENT DOCUMENTS

| EP | 2030664 A1 | 3/2009 |
|---|---|---|
| EP | 2703060 A1 | 3/2014 |

OTHER PUBLICATIONS

Maik Skowronski, European Patent Office, Extended European Search Report in counterpart EP Patent Application No. 22173170.6, mailed Oct. 7, 2022, 7 pages total.

(Continued)

*Primary Examiner* — Madeline Gonzalez
(74) *Attorney, Agent, or Firm* — DiBerardino McGovern IP Group LLC

(57) ABSTRACT

A filter unit is disclosed that increases solids loading capacity, decreases specific flowrate during filtration, and improves backwash effectiveness. A flow shaping plate and/or flow diverting member are used to reduce flow entrance effects during reverse, backwash flow through the filter unit.

15 Claims, 8 Drawing Sheets

(56) References Cited

U.S. PATENT DOCUMENTS 6,179,888 B1 1/2001 Mangiaforte
9,616,371 B1 4/2017 Clements

OTHER PUBLICATIONS

European Patent Office, Communication Pursuant to Article 94(3) EPC in counterpart EP Patent Application No. 22173170.6, mailed Sep. 6, 2023, 5 pages total.
European Patent Office, Communication Pursuant to Article 94(3) EPC, counterpart EP Patent Application No. 22173170.6, mailed Mar. 11, 2024, 5 pages total.

* cited by examiner

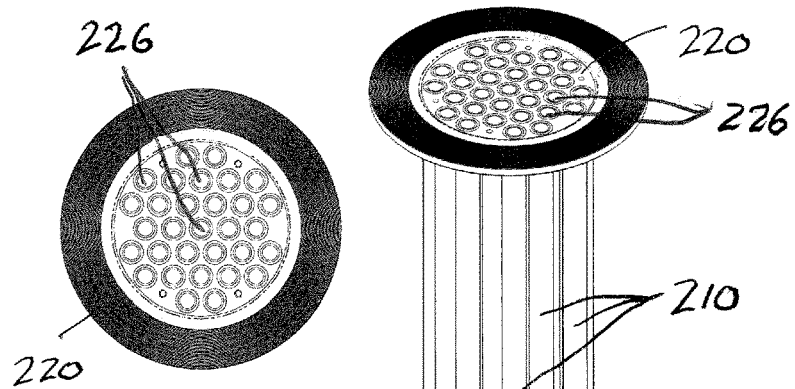
FIG. 3
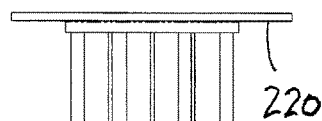
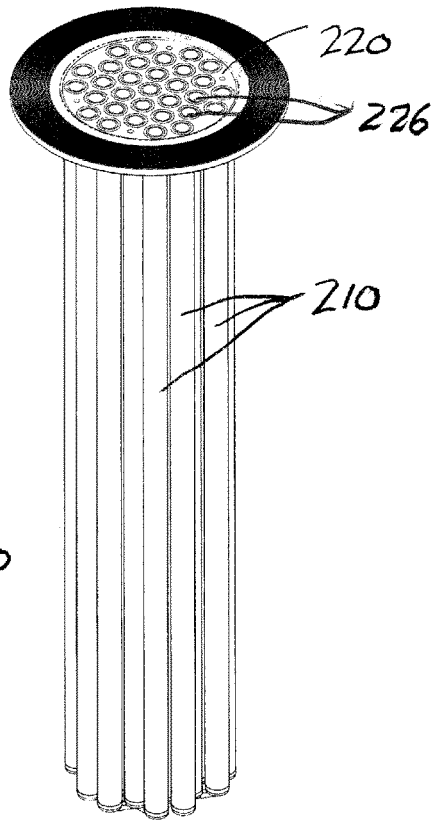
FIG. 6
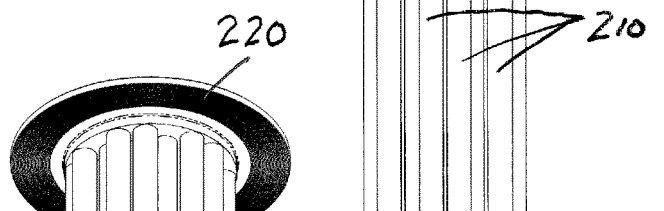
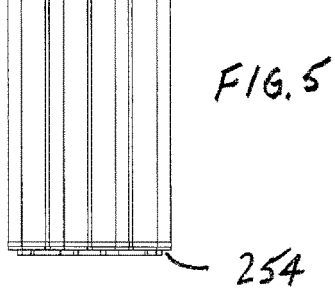
FIG. 5
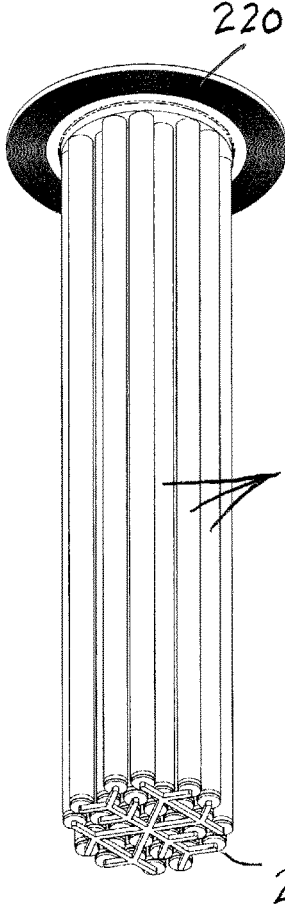
FIG. 4
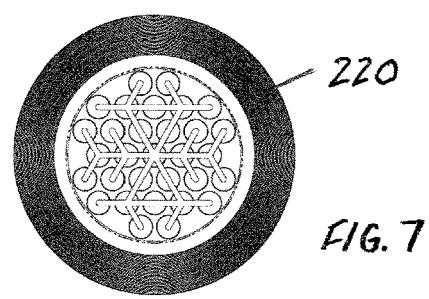
FIG. 7

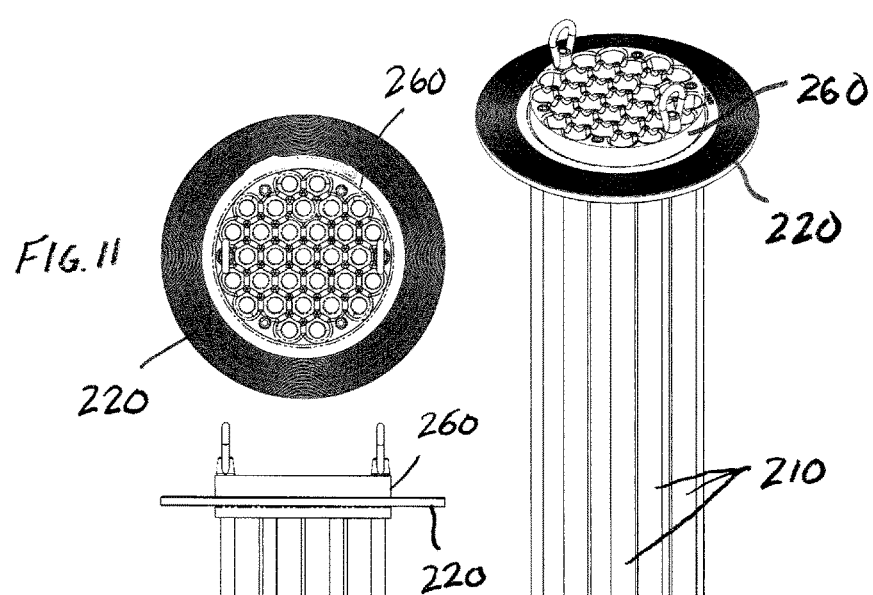
FIG. 11
FIG. 8
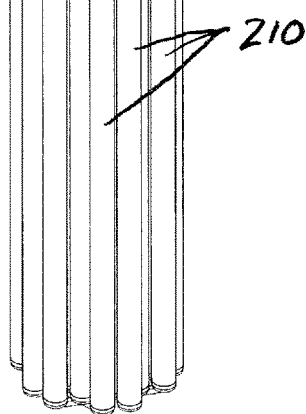
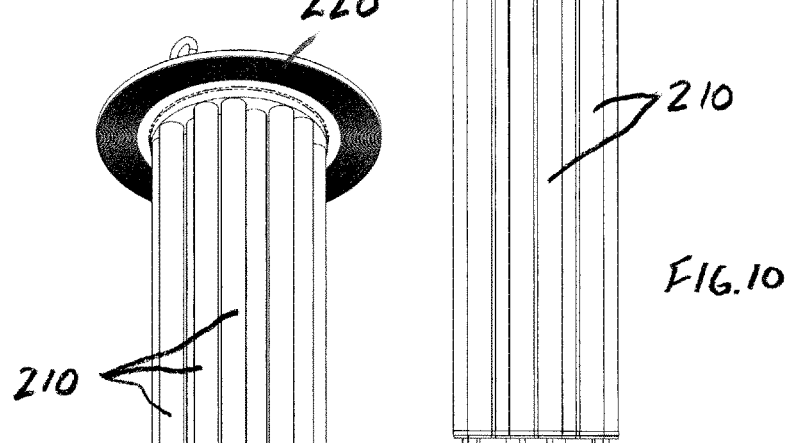
FIG. 10
FIG. 9
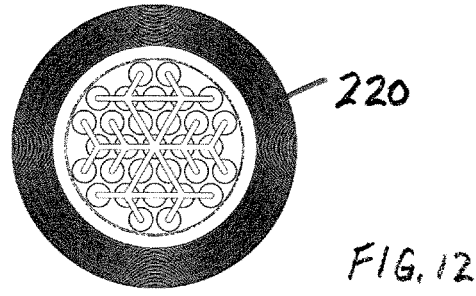
FIG. 12

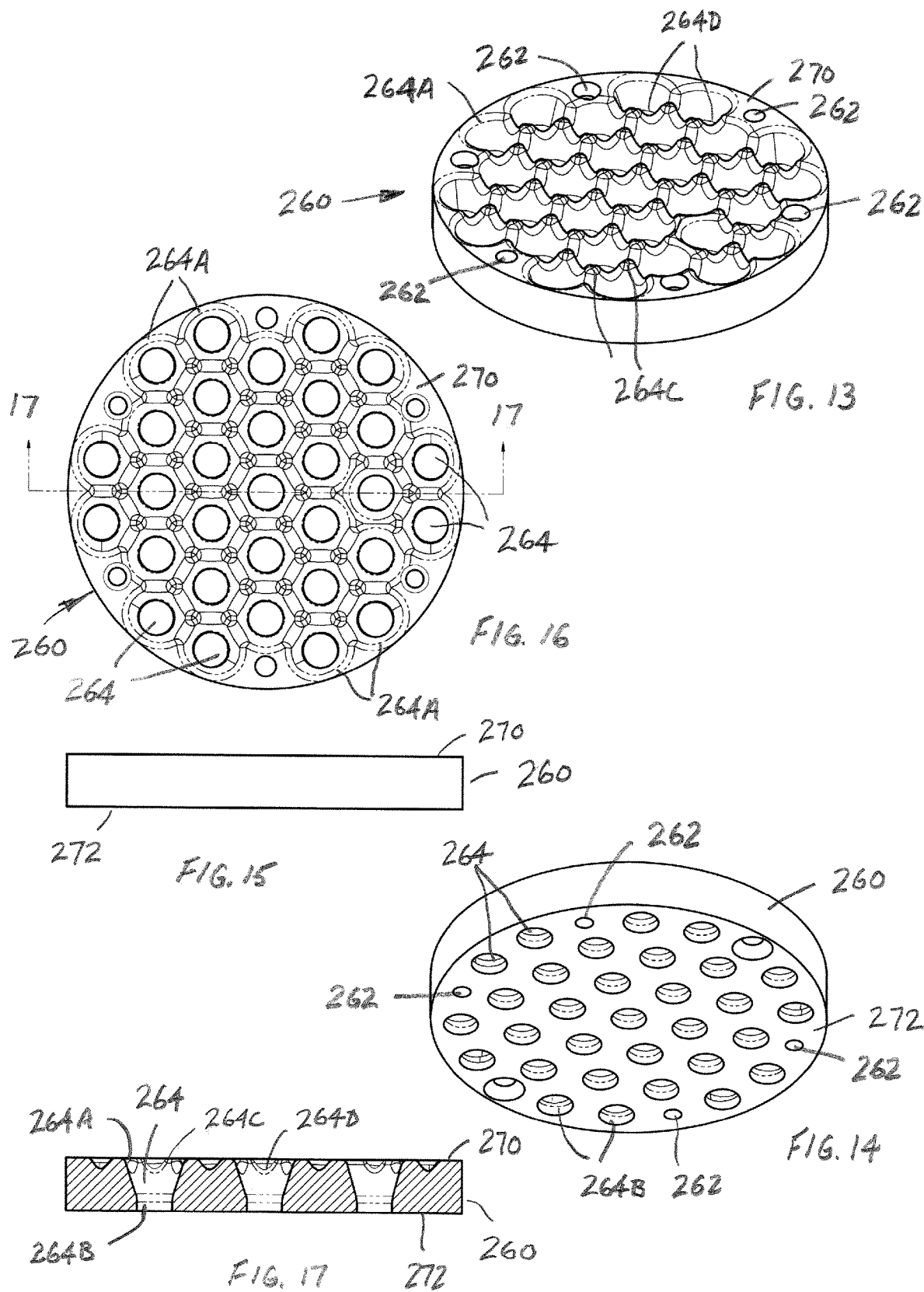

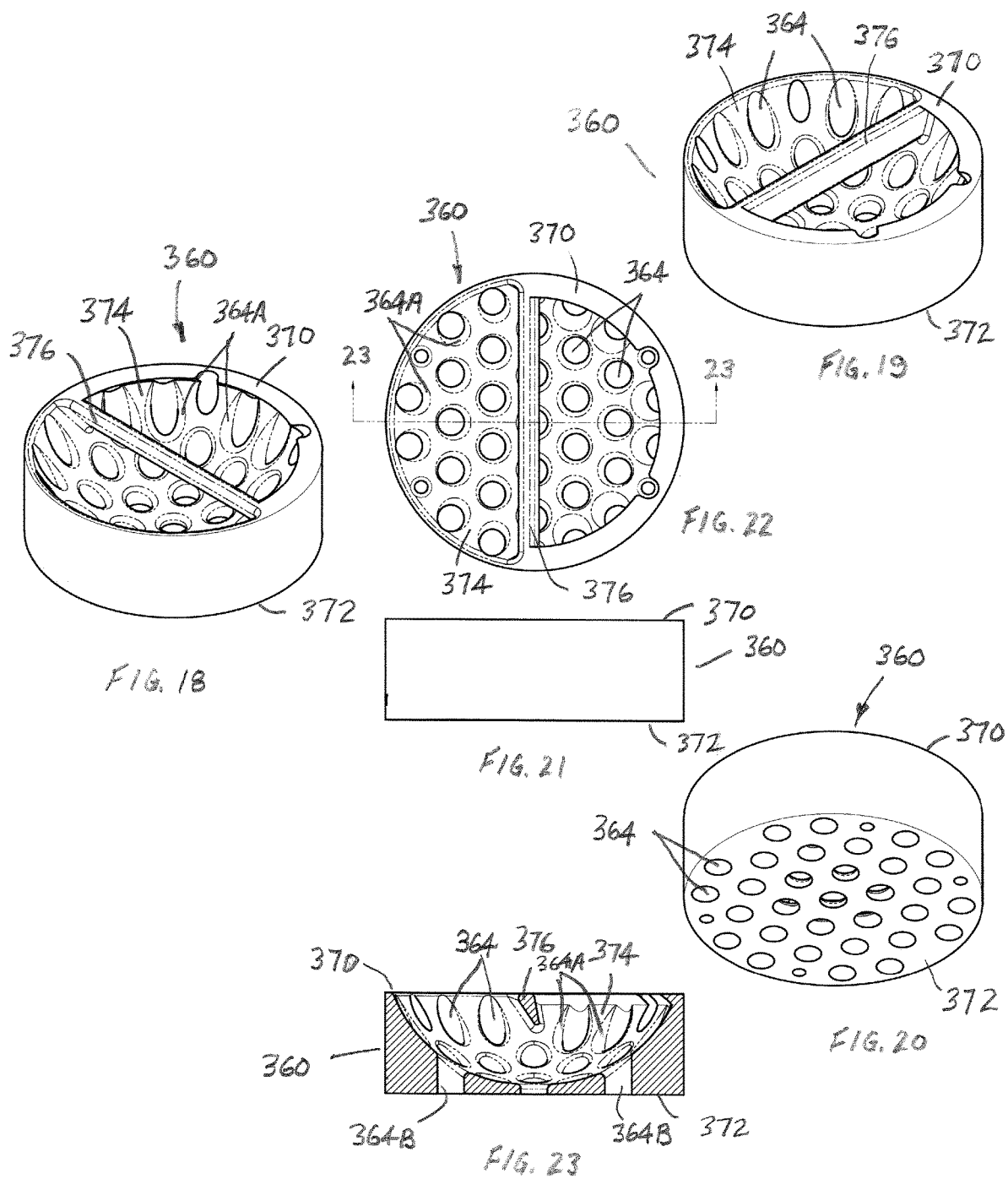

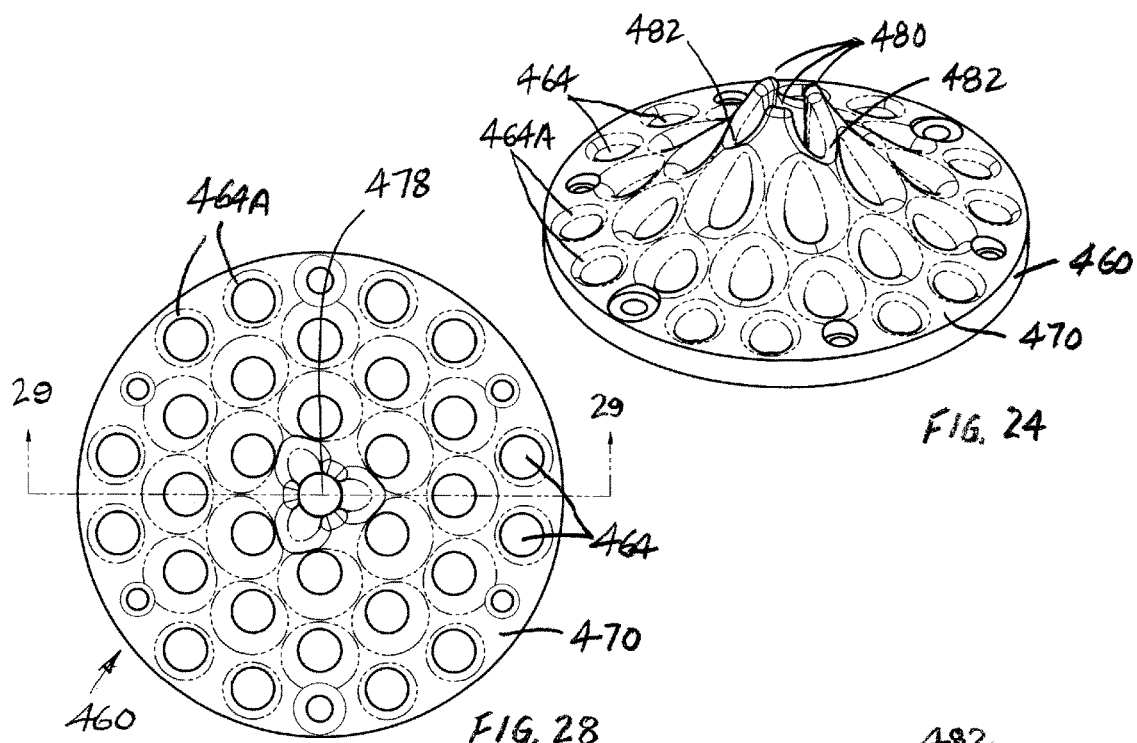
FIG. 24
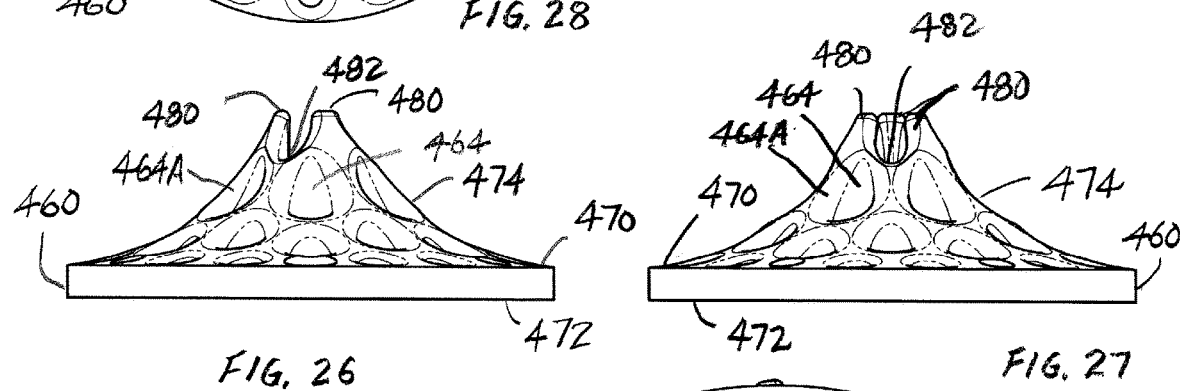
FIG. 28
FIG. 26
FIG. 27
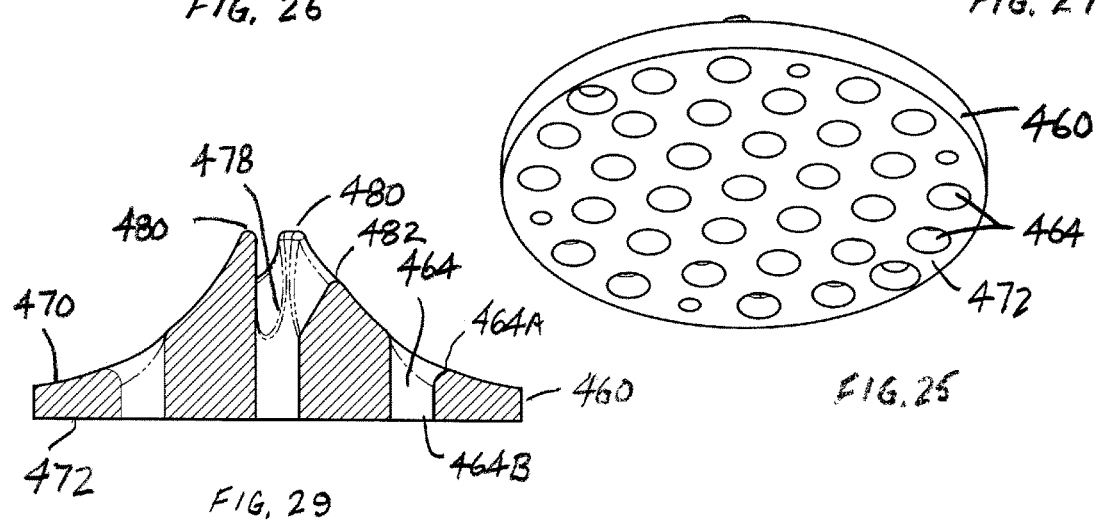
FIG. 29
FIG. 25

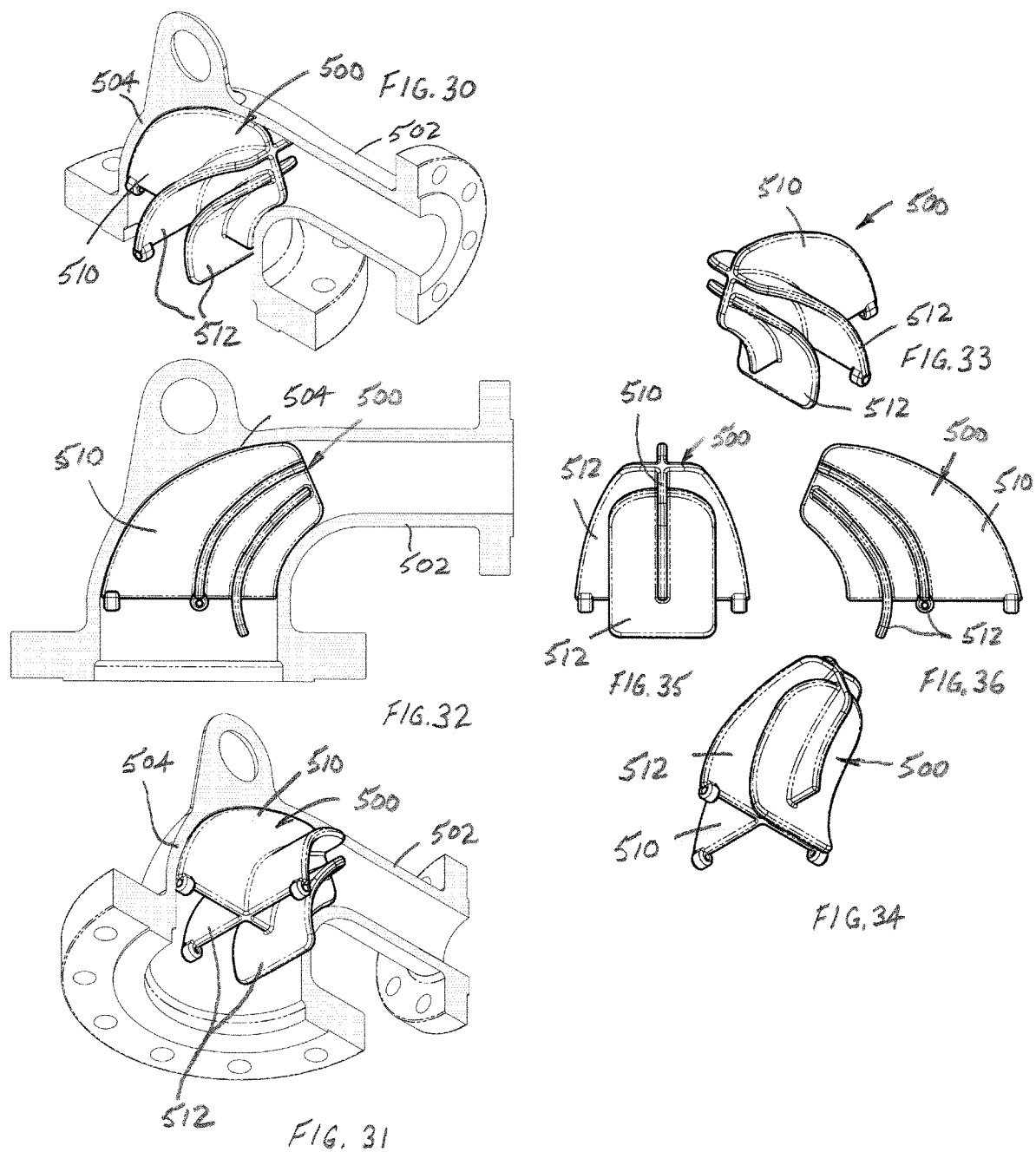

FILTER UNIT WITH FLOW OPTIMIZATION

CROSS-REFERENCE TO RELATED APPLICATION

This application claims the benefit of U.S. Provisional Application No. 63/188,182 filed on May 13, 2021 and titled FILTER UNIT WITH FLOW OPTIMIZATION, which is incorporated herein by reference in its entirety.

BACKGROUND

This invention relates to filter assemblies or filter units, and particularly filter units used in industrial processes. This application is related to commonly owned U.S. Pat. No. 5,785,870, the entire disclosure of which is incorporated herein by reference.

Many hydrocarbon refining processes utilize catalytic reactors to add value to lower quality feedstocks. Catalytic reactors are large vessels filled with catalyst particles arranged in trays, through which the feedstock oil flows. By adding steam or hydrogen, the oil can be improved to more valuable products such as fuels and lubricating oil. The catalyst reactor must be protected by filtration to optimize the life of the catalyst particles and minimize differential pressure across the reactor.

A need exists for still further improvements in connection with refinery protection filtration. Improved performance is desired by increasing solids loading capacity, decreasing specific flowrate during filtration, and improving backwash effectiveness. Any improvements are preferably capable of retrofitting existing filter systems, in addition to being used in new installation.

Generally, filter units of this type include two operating modes, namely, (i) filtration mode and (ii) backwash mode. In the filtration mode, dirty process liquid flows through the filter housing entrance or inlet and to the outside of the filter element sticks. The fluid passes through the filter media, leaving any separated solids to accumulate on the exterior of the stick surface. Clean fluid then passes through the interior of each filter stick and ultimately through a flange into the outlet portion of the filter housing and onward. The flange serves as a separation between dirty and clean portions of the filter housing to prevent cross-contamination.

As solids accumulate on the filter elements or filter sticks during filtration mode, differential pressure begins to rise between the inlet and outlet sides of the filter housing. Once this differential pressure reaches a terminal value, the filter element is regenerated by backwashing. During a backwash cycle, the flow is reversed across the filter housing. Clean fluid is supplied under pressure to serve as the backwashing medium. The clean backwash fluid flows through the element flange into each of the individual filter elements or filter sticks, flowing down each stick and then through. The backwash flow is intended to dislodge the accumulated solids on the exterior of each stick and then flush them away, thus regenerating the filter element. A typical backwash cycle takes 6-10 seconds and turns the volume of fluid in the housing over several times.

A need exists for an improved geometric arrangement to ensure a consistent and maximized spacing between the filter sticks, which will improve flow distribution and filter cake formation during filtration mode.

Poor backwashing recovery over certain areas of each filter stick was observed, resulting in an eventual loss of effective filter area. This reduction of effective filter area is sometimes referred to as "seasoning" of the filter element and typically occurred early in the use of new filter elements. The reduction in operational cycle time between backwashes ultimately stabilized at a final, reduced cycle time, and one area for improvement was identified to reduce or eliminate element "seasoning"

A need exists for an improved arrangement that provides at least one or more of the above-described features, as well as still other features and benefits.

SUMMARY

This invention relates to a new filter unit, and particularly a filter unit that increases solids loading capacity, decreases specific flowrate during filtration, and improves backwash effectiveness.

A preferred embodiment of a filter unit for removing matter from an associated process stream includes a housing having a first, inlet end and a second, outlet end spaced from one another along a longitudinal axis. Plural elongated, spaced filter elements are received in the housing and extend between the inlet and outlet ends thereof and are laterally spaced from one another to enhance matter removal from the associated process stream. A flow shaping plate is located at the outlet end of the housing, and includes plural openings, one for each of the plural filter elements, for enhancing more uniform flow over the filter elements. The plural openings of the flow shaping plate including enlarged dimension portions adjacent a first face thereof, smaller dimension portions adjacent a second face thereof, and smoothly contoured transition regions interconnecting each enlarged dimension portion with an associated smaller dimension portion in an intermediate region of the flow shaping plate.

In one version, the enlarged dimension portions of the openings in the flow shaping plate merge into an arcuate surface on the first face of the flow shaping plate.

The arcuate surface may be a single arcuate shape extending over a major portion of the first face of the flow shaping plate, and may be concave, e.g., hemispherical.

A dividing member extending diametrically across the flow shaping plate may include an airfoil cross-sectional shape.

In another version, a central portion of the first face of the flow shaping plate extends outwardly a greater dimension than a peripheral portion thereof, and a sloping region interconnecting the central portion with the peripheral portion.

A central opening in the central portion may be circumscribed by alternating peaks and valleys.

The second face of the flow shaping plate is preferably planar.

In still another embodiment of the flow shaping plate, each opening in the first face is circumscribed by alternating peaks and valleys.

A ninety-degree passage secured adjacent the outlet preferably includes a flow diverting member therein that improves flow and pressure distribution into the flow shaping plate during reverse flow through the filter unit.

The flow diverting member is preferably located in the ninety-degree passage at an elbow thereof.

An increased number of filter elements (from 28 filter elements to 31 filter elements) still has similar overall dimensions to the existing commercial filter unit and thus can be fitted into existing filter systems.

The increased number of filter elements results in an approximately 10.7% increase in surface area by increasing filter element sticks to 31. This increase in surface area can directly increase the throughput capacity of an existing filter installation by element replacement.

Optimizing flow distribution also reduces hydraulic flow loss across the element.

Another advantage resides in maximizing element solids capacity through optimized filter element stick spacing.

Yet another improvement relates to reducing operating costs both through potential reduction in initial equipment installation, as well as reduction of backwash waste stream.

Still another benefit is associated with a nozzle entrance module which optimizes backwash efficiency by reducing flow entrance effects into the sticks or filter elements during reverse flow, which will recover more surface area during backwash by minimizing entrance effects, and improving flow and pressure distribution inside the filter sticks during backwash cycle operation. Changes were made to address flow separation and recirculation in the first several inches of each stick directly below the flange caused at least in part by a high-velocity entrance region.

A new flow-shaping nozzle module is preferably a separate piece or component that is installed on the flange and utilizes an optimized geometry design. As the fluid mechanics governing entrance effects are dependent upon both tube diameter and geometry as well as a fluid entrance number that is based on Reynolds number (fluid parameters including density, dynamic viscosity and flow velocity), custom flow-shaping nozzle modules can be designed for different applications, and optimized for different fluids and process conditions. Preferably, the flow-shaping nozzle module bolts onto the element assembly so that it is possible to change out easily and tailor the nozzle module to specific process conditions.

Benefits and advantages of the present disclosure will become more apparent from reading and understanding the following detailed description.

BRIEF DESCRIPTION OF THE DRAWINGS

FIG. 3 is a perspective view of selected components of a modified filter unit.

FIG. 4 is a second perspective view of the selected components of FIG. 3.

FIG. 5 is an elevational view of the selected components of FIG. 3.

FIG. 6 is a top plan view of the selected components shown in FIG. 3.

FIG. 7 is a bottom view of the selected components shown in FIG. 3.

FIG. 8 is a perspective view of selected components of an alternative modified filter unit.

FIG. 9 is a second perspective view of the selected components of FIG. 8.

FIG. 10 is an elevational view of the selected components of FIG. 8.

FIG. 11 is a top plan view of the selected components shown in FIG. 8.

FIG. 12 is a bottom view of the selected components shown in FIG. 8.

FIG. 13 is a perspective view of a disk-shaped flange with improved flow features.

FIG. 14 is a second perspective view of the disk-shaped flange of FIG. 13.

FIG. 15 is an elevational view of the disk-shaped flange of FIG. 13.

FIG. 16 is a top plan view of the disk-shaped flange of FIG. 13.

FIG. 17 is a cross-sectional view of the disk-shaped flange of FIG. 13 taken generally along the lines 17-17 of FIG. 16.

FIG. 18 is a perspective view of a second embodiment of a disk-shaped flange with improved flow features.

FIG. 19 is a second perspective view of the disk-shaped flange of FIG. 18.

FIG. 20 is a third perspective view of the disk-shaped flange of FIG. 18.

FIG. 21 is an elevational view of the disk-shaped flange of FIG. 18.

FIG. 22 is a top plan view of the disk-shaped flange of FIG. 18.

FIG. 23 is a cross-sectional view of the disk-shaped flange of FIG. 18 taken generally along the lines 23-23 of FIG. 22.

FIG. 24 is a perspective view of a third embodiment of a disk-shaped flange with improved flow features.

FIG. 25 is a second perspective view of the disk-shaped flange of FIG. 24.

FIG. 26 is an elevational view of the disk-shaped flange of FIG. 24.

FIG. 27 is a second elevational view of the disk-shaped flange of FIG. 24 where the flange is turned approximately 90° relative to the view of FIG. 26.

FIG. 28 is a top plan view of the disk-shaped flange of FIG. 24.

FIG. 29 is a cross-sectional view of the disk-shaped flange of FIG. 24 taken generally along the lines 29-29 of FIG. 28.

FIG. 30 is a perspective view of a flow diverter received in an elbow of an outlet flow passage shown in cross-section.

FIG. 31 is a second perspective view of the flow diverter and outlet flow passage of FIG. 30.

FIG. 32 is an elevational view of the flow diverter received in the outlet flow passage shown in cross-section.

FIG. 33 is a perspective view of the flow diverter of FIG. 30.

FIG. 34 is a second perspective view of the flow diverter of FIG. 30.

FIG. 35 is an elevational view of the flow diverter taken generally from the anterior side of FIG. 33.

FIG. 36 is an elevational view of the flow diverter taken generally from the right-hand side of FIG. 33.

DETAILED DESCRIPTION

Figure 1:
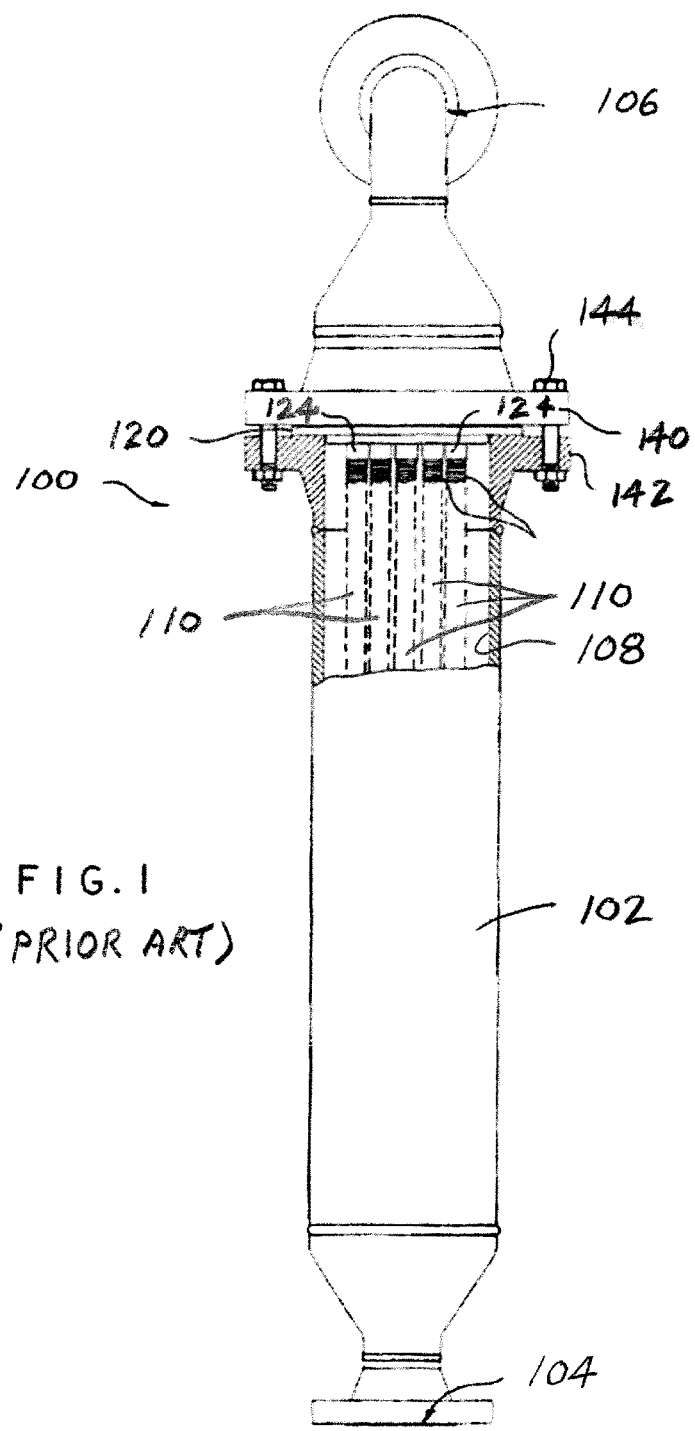
FIG. 1 is an elevational view partly in cross-section of a prior art filter unit.

The following description with reference to the accompanying drawings is provided to assist in a comprehensive understanding of one or more embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. Various exemplary embodiments of the present disclosure are not limited to the specific details of different embodiments and should be construed as including all changes and/or equivalents or substitutes included in the ideas and technological scope of the appended claims. In describing the drawings, where possible similar reference numerals are used for similar elements.

The terms "include" or "may include" used in the present disclosure indicate the presence of disclosed corresponding functions, operations, elements, and the like, and do not limit additional one or more functions, operations, elements, and the like. In addition, it should be understood that the terms "include", "including", "have" or "having" used in the present disclosure are to indicate the presence of components, features, numbers, steps, operations, elements, parts, or a combination thereof described in the specification, and do not preclude the presence or addition of one or more other features, numbers, steps, operations, elements, parts, or a combination thereof.

The terms "or" or "at least one of A or/and B" used in the present disclosure include any and all combinations of words enumerated with them. For example, "A or B" or "at least one of A or/and B" mean including A, including B, or including both A and B.

Although the terms such as "first" and "second" used in the present disclosure may modify various elements of the different exemplary embodiments, these terms do not limit the corresponding elements. For example, these terms do not limit an order and/or importance of the corresponding elements, nor do these terms preclude additional elements (e.g., second, third, etc.) The terms may be used to distinguish one element from another element. For example, a first mechanical device and a second mechanical device all indicate mechanical devices and may indicate different types of mechanical devices or the same type of mechanical device. For example, a first element may be named a second element without departing from the scope of the various exemplary embodiments of the present disclosure, and similarly, a second element may be named a first element.

It will be understood that, when an element is mentioned as being "connected" or "coupled" to another element, the element may be directly connected or coupled to another element, and there may be an intervening element between the element and another element. To the contrary, it will be understood that, when an element is mentioned as being "directly connected" or "directly coupled" to another element, there is no intervening element between the element and another element.

The terms used in the various exemplary embodiments of the present disclosure are for the purpose of describing specific exemplary embodiments only and are not intended to limit various exemplary embodiments of the present disclosure. As used herein, the singular forms are intended to include the plural forms as well, unless the context clearly indicates otherwise.

All of the terms used herein including technical or scientific terms have the same meanings as those generally understood by an ordinary skilled person in the related art unless they are defined otherwise. The terms defined in a generally used dictionary should be interpreted as having the same meanings as the contextual meanings of the relevant technology and should not be interpreted as having inconsistent or exaggerated meanings unless they are clearly defined in the various exemplary embodiments.

Figure 2:
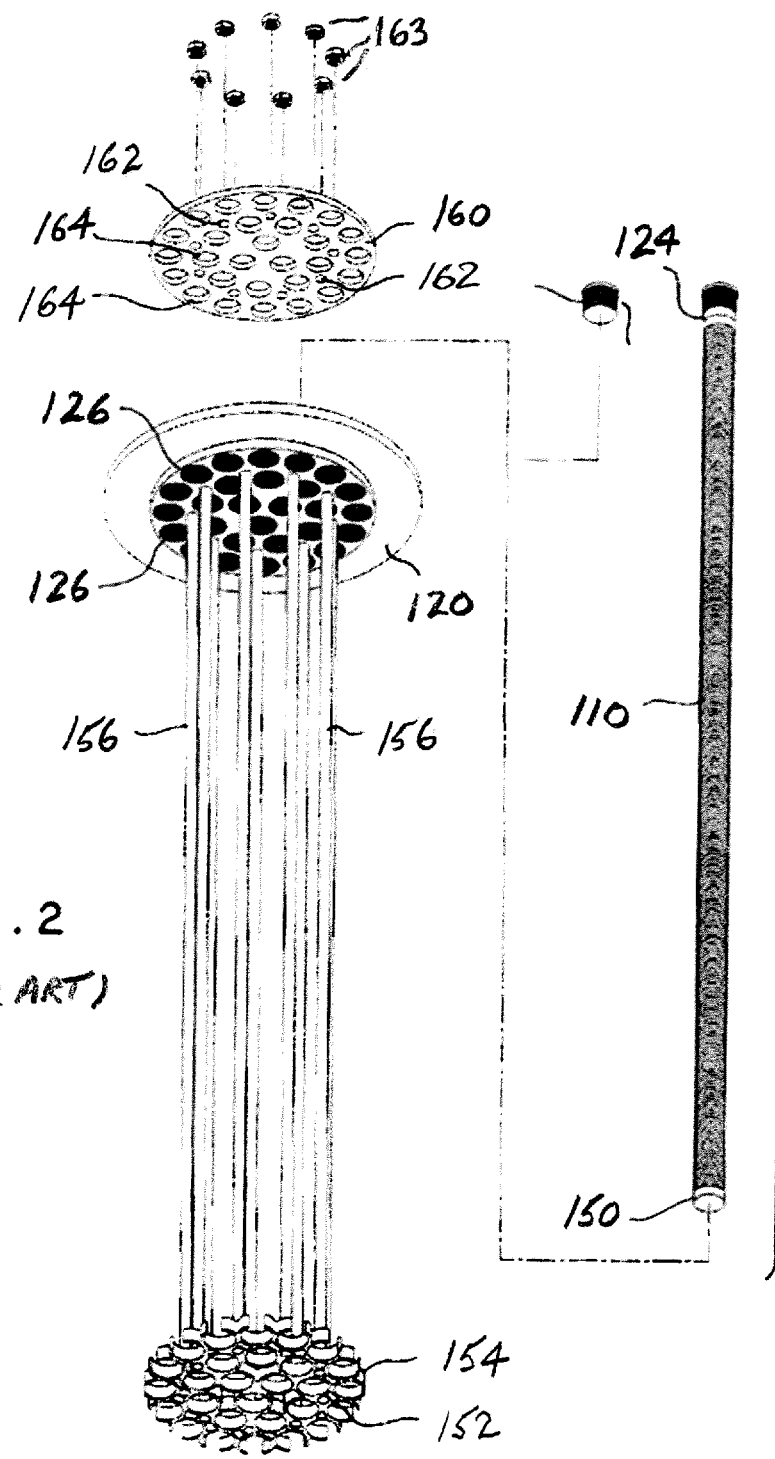
FIG. 2 is an exploded perspective view of selected components of the prior art filter unit of FIG. 1.

Turning initially to FIGS. 1 and 2, there is shown a filter assembly or filter unit 100 that includes a housing 102. The housing 102 includes a first or inlet port 104 adjacent a first end of the housing 102 and a second or outlet port 106 adjacent a second end of the housing. Dirty process fluid, i.e., liquid, is introduced into the filter housing 102 through inlet 104 and exits the housing post-filtration at outlet 106. Defined between the inlet 104 and outlet 106 is a hollow chamber or cavity 108 that receives multiple filter elements or filter element sticks 110. Although the commercial embodiment shown and described in commonly owned U.S. Pat. No. 5,785,870 included twenty-eight filter element sticks the present disclosure increases this number to thirty-one filter element sticks as will be described further below.

Each filter element stick 110 is an elongated hollow structure such as a metal rod that receives the flow around the outer perimeter thereof. The fluid passes through the filter media of the filter element sticks 110 whereby separated solids that cannot pass through the filter media accumulate on the exterior surface of the filter element sticks. Clean fluid passes through and continues through the interior of each filter element stick 110 and exits the cavity 108 passing through a disk-shaped flange 120. More particularly, the disk-shaped flange 120 preferably receives a coupling end 124 of each of the filter stick elements 110 and thus the disk-shaped flange 120 includes a same number of openings 126 as there are filter element sticks 110 so that each stick is secured to a separate opening (FIG. 2). The disk-shaped flange 120 is provided with internal threads in each of the openings 126. More particular details of one preferred fastening arrangement is detailed in the '870 patent, although other fastening arrangements such as welding are also contemplated. A flange or plate 140 is received over and secures the disk-shaped flange 120 to an enlarged radial shoulder 142 of the housing with circumferentially spaced fasteners 144. As also illustrated in FIG. 2, lower ends 150 of the filter element sticks 110 are received in openings 152 of a support member 154. Further, the support member 154 receives one end of elongated coupling rods 156 that extend parallel to the filter element sticks 110 and have their opposite ends threadedly received in the disk-shaped flange 120. Still further, a plate 160 includes openings 162 to receive threaded ends of the coupling rods 156 threaded into fastener members or nuts 163, and also includes openings 164 that are concentric with and have the same diameter as the bores formed in the coupling heads 124 at the outlet end of the filter element sticks 110 and concentrically aligned with the openings 126 in the disk-shaped flange 120. The plate 160 acts as a retainer to keep the filter element sticks from leaving flange 120.

Turning to FIGS. 3-7, a new arrangement of the filter unit includes an increased number of filter element sticks 210 (similar to filter element sticks 110 of the prior arrangement and reference numerals are identified in the "200" series for ease of reference and understanding with respect to those components previously identified in the "100" series). The elongated filter element sticks 210 are closed at first or lower ends 254 and second or upper ends are received in openings 226 in the disk-shaped flange 220. A primary difference between those features illustrated in FIGS. 3-7 and the prior art arrangement of FIGS. 1 and 2 relates to the number of filter element sticks 210. As noted previously, the number of filter element sticks 210 is increased to correspondingly increase the total surface area of the filter arrangement by approximately 10.7%. This increase of surface area directly increases the throughput capacity of existing filter installations where the filter element sticks 210 and disk-shaped flange 220 are used to replace the existing filter element sticks 110 and flange arrangement 110.

As more particularly illustrated in a first embodiment shown in FIGS. 8-17, flow shaping plate or flow-shaping nozzle module 260 includes openings 262 to receive fasteners such as bolts (not shown) to secure the flow shaping plate to the disk-shaped flange 220. The flow shaping plate also includes openings 264 that are modified to provide the desired flow shaping features not present in the prior arrangements. More particularly, as particularly evident in FIGS. 13 and 17, the flow shaping features associated with the openings 264 control the fluid flow during backwash by providing a contoured arrangement that minimizes entrance effects and improves flow and pressure distribution inside the filter element sticks 210 during backwash. The flow shaping plate 260 is preferably a separate component (so that it can be advantageously substituted or retrofit into existing filter units) installed on the flange 220 and the flow shaping plate uses an optimized geometry to enhance flow distribution that reduces hydraulic flow losses across the filter element and improves backwash effectiveness. This design minimizes entrance effects and improves flow and pressure distribution inside the filter sticks during backwash cycle operation. It was observed that prior arrangements had a pronounced entrance effect where the high velocity in the entrance region caused flow separation and recirculation in the first several inches or upper portion of each stick directly below the flange. These effects resulted in poor backwashing recovery over this area of each filter stick, ultimately resulting in an eventual loss of effective filter area (sometimes referred to as "seasoning" of the filter element that occurred during early use of new filter elements). As a result of this reduction in effective filter area, a corresponding reduction in operational cycle time between backwashes was exhibited, ultimately stabilizing at a final, reduced cycle time. By including the flow shaping plate 260, improved flow characteristics particularly in the entrance region (i.e., the first several inches of each stick directly below the flange 220) are achieved to provide more effective backwashing.

As evident in FIGS. 13-17, the flow shaping plate 260 is preferably a separate component that is installed on top of the disk-shaped flange 220 (FIGS. 8 and 10). The geometry of the flow shaping plate 260 can adopt a variety of configurations since entrance effects during backwash are dependent on both the tube diameter, geometry, and fluid entrance number based on Reynolds number (fluid parameters including density, dynamic viscosity, and flow viscosity). Since the flow shaping plate 260 is fastened (e.g., bolted) to the flange 220, the flow shaping plate can be easily changed out as deemed necessary.

As shown in FIGS. 8, 11, 13, and 17, one preferred embodiment includes openings 264 that have enlarged dimension portions 264A adjacent a first or upper face 270 of the flow shaping plate 260 and the opening reduces in cross-sectional dimension, i.e., tapers toward a smaller dimension portion 264B adjacent a second face 272 of the flow shaping plate. Further, alternating peaks 264C and valleys 264D surround a perimeter of each opening 264 at the enlarged dimension portion 264A adjacent the upper face 270 of the flow shaping plate 260. The peaks 264C and valleys 264D include smooth transitions that optimize the flow through the flow shaping plate 260 and ultimately into the upper ends of the filter element sticks 210 during backwash.

A second embodiment of a flow shaping plate is shown in FIGS. 19-23, and for purposes of brevity and understanding, reference numerals in the "300" series are used in connection with this alternate embodiment of flow shaping plate 360. The flow shaping plate 360 is again preferably a separate component that is installed on top of the disk-shaped flange 220 (FIGS. 3 and 6). Generally, the openings 364 include enlarged dimension portions 364A adjacent the upper, first face 370 of the flow shaping plate 360 while smaller dimension portions 364B are provided adjacent the second, lower face 372 of the flow shaping plate. To further smooth the transition of flow characteristics during backwash through the flow shaping plate 360, this embodiment includes an arcuate surface, particularly concave (hemispherical) surface 374, and as a result of incorporating the concave surface, the openings 364 at the backwash entrance regions 364A are elongated or stretched to form partial ellipsoids. These structural characteristics of the flow shaping plate 360 result in a more even flow distribution as the backwash flow enters into the individual filter element sticks. In addition, a handle 376 extends diametrically across the first face 370 of the flow shaping plate 360 to aid in installation and removal of the flow shaping plate. As best seen in FIG. 23, the dividing member 376 preferably has an airfoil cross-sectional shape to facilitate smooth fluid flow therearound during the backwash process.

A third embodiment of a flow shaping plate 460 is shown in FIGS. 24-29. Here, the flow shaping plate 460 has an arcuate shape 474 that extends outwardly from the first, upper face 470. More particularly, the arcuate shape 474 includes a central portion of the first face 470 that extends outwardly a greater dimension than a peripheral portion thereof, and a sloping region interconnecting the central portion with the peripheral portion on the first face. A central opening 478 in the central portion is circumscribed by alternating peaks 480 and valleys 482. As a result of the outwardly extending central portion 474, the entrance regions 464A and the openings 464 have elongated or stretched configurations that communicate with exit regions 464B located adjacent the second, lower face of the flow shaping plate. On the other hand, the second or lower face 472 of the flow shaping plate 460 is planar, allowing the flow shaping plate to abut or mate with the flange 220.

FIGS. 30-36 particularly illustrate a flow diverting member 500 that can be used as a separate feature or in combination with one of the flow shaping plates disclosed above. The flow diverting member 500 is dimensioned for receipt in the outlet passage 502 that forms the outlet of the filter unit. Particularly, the flow diverting member 500 is located in the 90° passage portion i.e., preferably at the elbow 504 of the passage 502. In a preferred form, the flow diverting member 500 includes a central vertical member 510 that divides the passage in half, and two or more lateral members 512 that extend outwardly from opposite faces of the vertical member act as vanes to distribute flow. Each of the vertical member 510 and lateral members 512 are smoothly contoured in order to redirect and smooth fluid flow through the elbow of the passage 502 so that during the backwash process, backwash flow exits the passage more uniformly across the cross-section of the passage before entering into a flow shaping plate. The flow diverting member 500 is preferably a separate component that can be used to retrofit existing filter units, as well as advantageously used with one of the flow shaping plates described above.

In summary, the present filter unit features a 31-stick design with, for example, an 8" flange design. It has similar overall dimensions to existing filter units such as shown in FIGS. 1-2 and thus can be fitted into existing filter systems using 8" element designs.

The theory of operation for flanged filter elements includes two operating modes: A) filtration mode; and B) backwash mode. In filtration mode, dirty process liquid is flowed through the filter housing entrance and to the outside of the filter element sticks. The fluid passes through the filter media, leaving any separated solids to accumulate on the exterior of the stick surface. Clean fluid then passes through the interior of each filter stick and ultimately through a flange into the outlet portion of the filter housing and onward. The flange serves as a separation between dirty and clean portions of the filter housing to prevent cross-contamination.

As solids accumulate on the filter sticks during filtration mode, differential pressure begins to rise between the inlet and outlet sides of the filter housing. Once this differential pressure reaches a terminal value, the filter element is regenerated by backwashing. During a backwash cycle, the flow is reversed across the filter housing. Clean fluid is supplied under pressure to serve as the backwashing medium. The clean backwash fluid flows through the element flange into each of the individual sticks, flowing down each stick and then through. The backwash flow is intended to dislodge the accumulated solids on the exterior of each stick and then flush them away, thus regenerating the filter element. A typical backwash cycle takes 6-10 seconds and turns the volume of fluid in the housing over several times.

The present filter unit arranges a quantity of 31 of 1" diameter filter sticks into an optimized array. The geometric arrangement ensures a consistent and maximized spacing between the filter sticks, which will improve flow distribution and filter cake formation during filtration mode. The addition of three more elements increases the surface area of the element by 10.7%. This increase of surface area can directly increase the throughput capacity of an existing filter installation by element replacement, and it can also improve competitive position of new systems. Optimized flow distribution will also reduce hydraulic flow loss across the element.

A unique feature of the present filter unit is the use of a flow-shaping nozzle module to optimize the flow into the element during backwash. Flow behavior in prior arrangements was similar to venturi-orifice flow, with a pronounced entrance effect region. This high-velocity entrance region caused flow separation and recirculation in the first several inches of each stick directly below the flange. These effects resulted in poor backwashing recovery over this area of each filter stick, resulting in an eventual loss of effective filter area. This observed reduction of effective filter area was referred to as "seasoning" of the filter element and typically occurred early in the use of new elements. It was denoted by a reduction in operational cycle time between backwashes, ultimately stabilizing at a final, reduced cycle time. It is a goal of the present unit to reduce or eliminate element "seasoning" by minimizing entrance effects and improving flow and pressure distribution inside the filter sticks during backwash cycle operation.

The flow-shaping nozzle module is a separate piece that is installed on the flange and utilizes an optimized geometry design, although it is contemplated that the flow-shaping plate/nozzle module and flange could be formed as a single component. As the fluid mechanics governing entrance effects are dependent upon both tube diameter and geometry as well as a fluid entrance number that is based on Reynolds number (fluid parameters including density, dynamic viscosity and flow velocity), it is believed that custom flow-shaping nozzle modules can be designed for different applications, optimized for different fluids and process conditions. As the module bolts onto the element assembly, it is possible to change out easily.

Given these advancements, it is expected that the value proposition, for example, for refinery protection filtration can be improved by reducing operating costs both through potential reduction in initial equipment installation as well as reduction of backwash waste stream.

This written description uses examples to describe the disclosure, including the best mode, and also to enable any person skilled in the art to make and use the disclosure. Other examples that occur to those skilled in the art are intended to be within the scope of the invention if they have structural elements that do not differ from the same concept or that do not differ from the literal language of the claims, or if they include equivalent structural elements with insubstantial differences from the same concept or from the literal language of the claims. Moreover, this disclosure is intended to seek protection for a combination of components and/or steps and a combination of claims as originally presented for examination, as well as seek potential protection for other combinations of components and/or steps and combinations of claims during prosecution.

Although specific advantages have been enumerated above, various embodiments may include some, none, or all of the enumerated advantages. Although exemplary embodiments are illustrated in the figures and description herein, the principles of the present disclosure may be implemented using any number of techniques, whether currently known or not. Moreover, the operations of the systems and apparatuses disclosed herein may be performed by more, fewer, or other components, and the methods described herein may include more, fewer, or other steps. Additionally, steps may be performed in any suitable order.

To aid the Patent Office and any readers of this application and any resulting patent in interpreting the claims appended hereto, applicants do not intend any of the appended claims or claim elements to invoke 35 USC 112 (f) unless the words "means for" or "step for" are explicitly used in the particular claim.

We claim:

1. A filter unit for removing matter from an associated process stream, the filter unit comprising:
   a housing having a first, inlet end and a second, outlet end spaced from one another along a longitudinal axis;
   plural elongated, spaced filter elements received in the housing and extending between the inlet and outlet ends thereof and laterally spaced from one another to enhance matter removal from the associated process stream; and
   a single-piece flow shaping plate located at one of the inlet and outlet ends of the housing, the single-piece flow shaping plate including plural openings, one for each of the plural filter elements, for enhancing more uniform flow over the plural filter elements, the plural openings of the single-piece flow shaping plate including enlarged dimension portions adjacent a first face thereof, smaller dimension portions adjacent a second face thereof, and smoothly contoured transition regions interconnecting each enlarged dimension portion with an associated smaller dimension portion in an intermediate region of the single-piece flow shaping plate, wherein an open end of each of the plural filter elements is received in one of the plural openings, the first and second faces of the single-piece flow shaping plate are planar, and each opening in the first face is circumscribed by alternating peaks and valleys that include smooth transitions.

2. The filter unit of claim 1 further comprising a ninety-degree passage secured adjacent the outlet end, the passage including a flow diverting member therein that improves flow and pressure distribution into the single-piece flow shaping plate during reverse flow through the filter unit.

3. The filter unit of claim 2 wherein the flow diverting member is located in the ninety-degree passage at an elbow thereof.

4. The filter unit of claim 1 wherein each of the plural openings communicates with the filter element received in the opening.

5. The filter unit of claim 1 wherein the smoothly contoured transition regions include curved regions.

6. The filter unit of claim 1 wherein one or more of the smaller dimension portions adjacent the second face are non-concentrically arranged relative to a respective enlarged dimension portion adjacent to the first face.

7. The filter unit of claim 1 wherein the smoothly contoured transition regions are configured to encourage flow through the single-piece flow shaping plate and into the plural filter elements during reverse flow.

8. The filter unit of claim 1 wherein the single-piece flow shaping plate further comprises openings configured to secure the single-piece flow shaping plate to a flange in the housing, and wherein the flow shaping plate is configured to be installed and removed from the flange.

9. A filter unit comprising:
a housing having a first, inlet end and a second, outlet end spaced from one another along a longitudinal axis;
plural elongated, spaced filter elements received in the housing and extending between the inlet and outlet ends thereof and laterally spaced from one another; and
a flow shaping plate located at one of the inlet and outlet ends of the housing, the flow shaping plate including plural openings, one for each of the plural filter elements, the plural openings of the flow shaping plate including enlarged dimension portions adjacent a first face thereof, smaller dimension portions adjacent a second face thereof, and smoothly contoured transition regions interconnecting each enlarged dimension portion with an associated smaller dimension portion in an intermediate region of the flow shaping plate, wherein the plural openings are unobstructed openings that pass through the flow shaping plate, the first and second faces of the flow shaping plate are planar, and each opening in the first face is circumscribed by alternating peaks and valleys that include smooth transitions.

10. The filter unit of claim 9 wherein each of the plural filter elements is received in one of the plurality openings.

11. The filter unit of claim 9 further comprising a ninety-degree passage secured adjacent the outlet end, the passage including a flow diverting member therein that improves flow and pressure distribution into the flow shaping plate during reverse flow through the filter unit.

12. The filter unit of claim 11 wherein the flow diverting member is located in the ninety-degree passage at an elbow thereof.

13. The filter unit of claim 9 wherein the smoothly contoured transition regions include curved regions.

14. The filter unit of claim 9 wherein the smoothly contoured transition regions are configured to encourage flow through the flow shaping plate and into the plural filter elements during reverse flow.

15. The filter unit of claim 9 wherein the flow shaping plate further comprises openings configured to secure the flow shaping plate to a flange in the housing, and wherein the flow shaping plate is configured to be installed and removed from the flange.

* * * * *